UNITED STATES PATENT OFFICE.

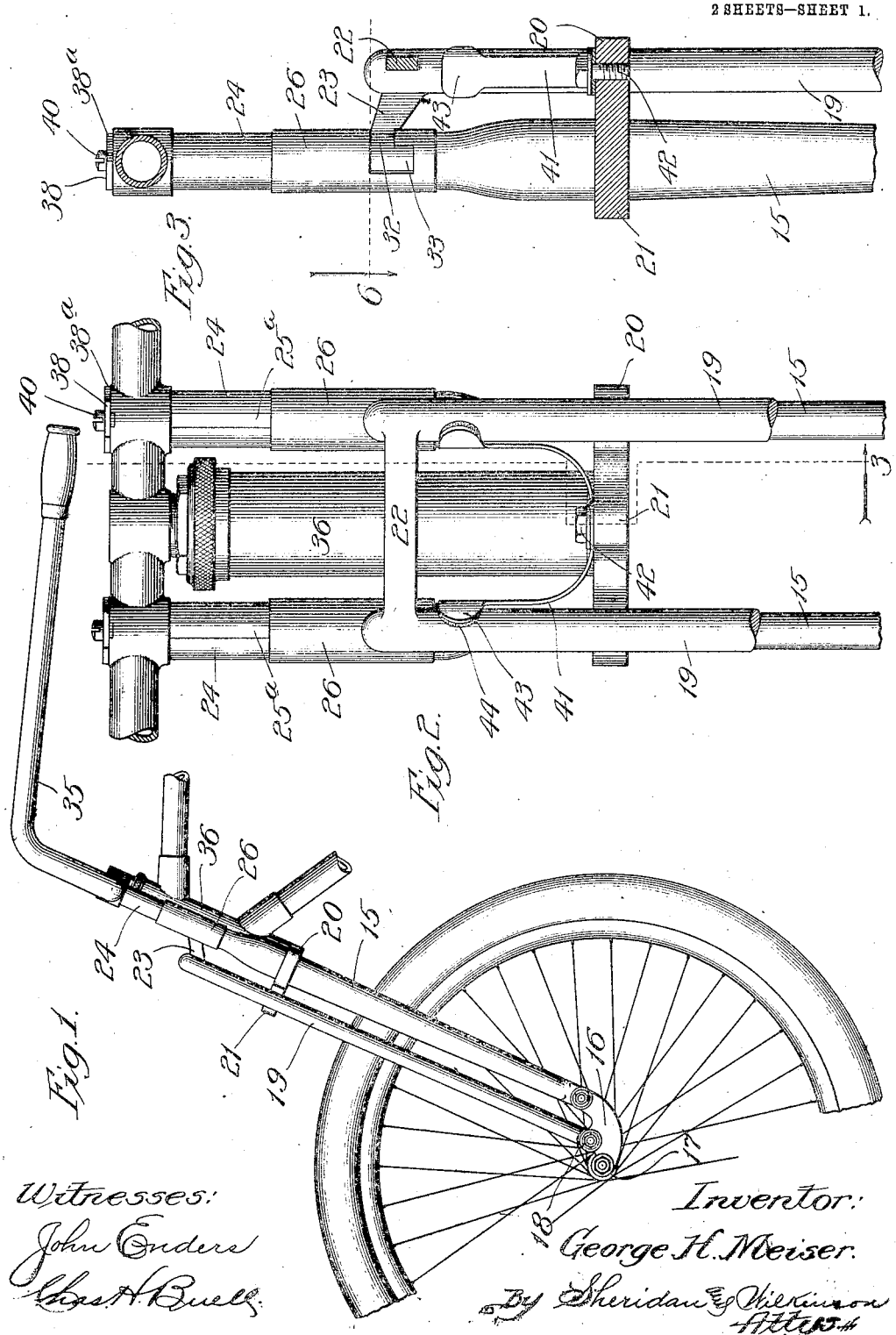

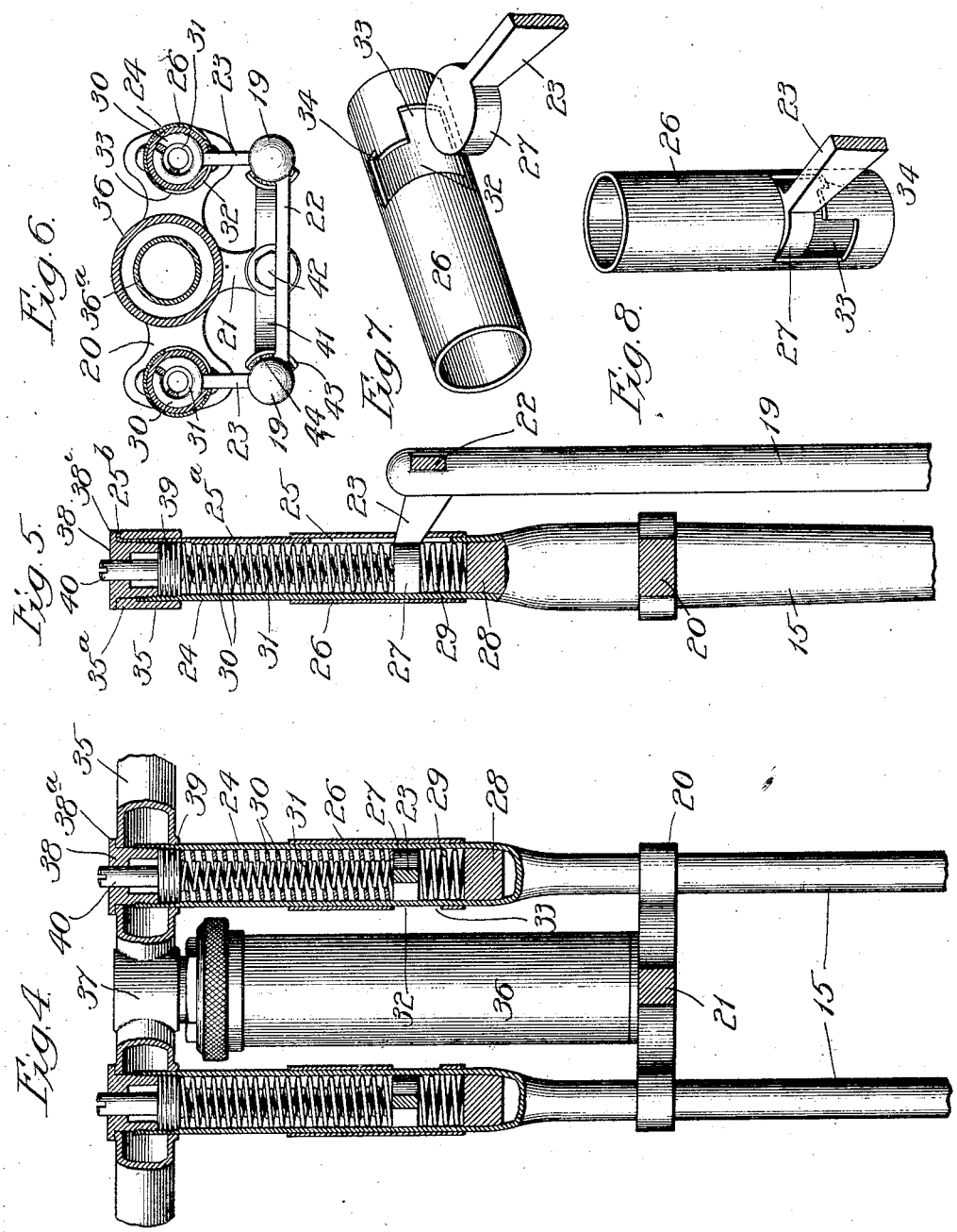

GEORGE H. MEISER, OF CHICAGO, ILLINOIS, ASSIGNOR TO EXCELSIOR SUPPLY COMPANY, A CORPORATION OF ILLINOIS.

BICYCLE.

No. 927,989.　　　Specification of Letters Patent.　　Patented July 13, 1909.

Application filed April 21, 1908. Serial No. 428,357.

*To all whom it may concern:*

Be it known that I, GEORGE H. MEISER, a citizen of the United States, residing at Chicago, in the county of Cook and State of Illinois, have invented certain new and useful Improvements in Bicycles, of which the following is a specification.

The object of my invention is to provide a suitable spring mounting for the front wheel of a bicycle.

My invention is especially adapted for use in a motor cycle.

In addition to providing a spring connection permitting relative displacement between the wheel and the frame, it is a secondary object to add a frictional brake by which vibration may be suppressed.

These objects and others will be made apparent in the following specification and claims, taken in connection with the accompanying drawings in which—

Figure 1 is a side elevation of the front end of a bicycle embodying my invention. Fig. 2 is a front elevation of the upper part of the bicycle. Fig. 3 is a section taken on the line 3 in Fig. 2 looking in the direction of the arrow. Fig. 4 is a view similar to that of Fig. 2, but showing some of the parts in section. Fig. 5 is a view similar to Fig. 3, but showing some of the parts in section. Fig. 6 is a transverse section taken on the line 6 in Fig. 3, looking in the direction of the arrow. Figs. 7 and 8 are perspective views of a detail that will be explained later.

The bicycle frame comprises a sleeve 36 at its front end which is an integral part of the frame. Through this extends a cylinder $36^a$ (Fig. 6), which is adapted to rotate within the sleeve 36. Rigidly attached to the bottom end of the member $36^a$ is a cross member 20 and from this the two limbs 15 extend down on either side of the front wheel. The member $36^a$, the cross member 20 and the two members 15 constitute the usual front fork. On each side of the bicycle there is a short lever 16 having a pivotal connection with the lower end of the corresponding fork member 15 and also with the wheel axle, as indicated by the reference numeral 17. A third point 18 on the lever is connected to the rod 19, which extends parallel with the fork members 15. There are two of these parallel rods 19, one at either side of the wheel, and they are rigidly united at the top by the cross member 22. From the top end of each an arm 23 extends. Each of the fork members 15 is prolonged above past the cross member 20 in a tubular extension 24, which has a longitudinal slot 25 on the front side thereof. The aforesaid projections 23 extend through the respective slots 25 and terminate in disks 27 within the tubes 24. Around each tube 24 and adapted to slide thereon is a short sleeve 26. Within each tube 24 there is fixed a plug 28 which acts as an abutment for the spring 29 lying between it and the disk 27. Above the disk 27 are co-axial helical springs 30 and 31. The sleeve 26 has a notch 32 with extensions therefrom 33 and 34 (see Figs. 7 and 8). The purpose of the opening 32 will be explained later.

The handle-bar 35 is connected at its central part 37 to the front fork member $36^a$. It also has two openings on either side of the central point 27 into which the upper ends of the tubes 24 project, the latter having the inner sides of the upper ends thereof screw threaded. The nut 38 projects into the said holes in the handle bar 35 and is externally screw threaded to engage the interior threads on the tube 24. The handle-bar 35 has overhanging shoulders $35^a$ (see Fig. 5) against which the end of the tube 24 abuts. The nut 38 has a flange $38^a$, which overhangs the handle-bar 35. It will at once be seen that by virtue of the shoulders $35^a$ and the flange $38^a$ the handle-bar 35 can be tightly clamped to the tube 24 by the nut 38. Below the nut 38 is an independent nut 39 which contacts with the upper ends of the springs 30 and 31. This nut 39 also has screw threaded engagement with the inner side of the tube 24. From it a stem 40 projects centrally through the nut 38 where it is adapted to be engaged by a screw-driver.

The cross member 20 carries a median forward projection 21 to which a spring yoke 41 is firmly attached at its center by means of the stud bolt 42. The yoke 41 terminates at each end in a widened part 43 of curved section containing a pad 44 of some material adapted to frictionally engage the supplementary fork members 19.

It will be seen that any sudden upward thrust on the front wheel acting through the lever 16 will displace the rods 19 in a vertical direction relatively to the front fork 15—15. This movement will be opposed by the strong coil springs 30 and 31. The strength and opposition of these springs may be adjusted by applying a screw-driver to the extension 40 from the nut 39. The spring 29 acts as a cushion to prevent a jar on the return of the springs 30 and 31. To prevent oscillation of the parts, due to the combined action of the springs 30 and 31 and the inertia of the frame or other parts, the friction brake 41—43 is provided. This quickly damps out any oscillatory movement between the fork 14 and the parallel members 19.

In assembling the parts the sleeves 26 are slipped over the disks 27 in the manner indicated in Figs. 7 and 8. Then the said disks 27 are introduced into the top ends of the tubes 24, the projection 23 passing down through the slots 25. In this position the projection 23 locks into the extension notch 34 and prevents the sleeve 26 from rotating. Thus the sleeve 26 covers the lower part of the slot. The upper part of the slot is filled by a strip 25ᵃ (Fig. 5) which is attached to the handle-bar 35 by means of the off-set 25ᵇ.

I claim:

1. In a motor-cycle, a front wheel fork composed of tubular members, a handle bar attached directly to said tubular members a relatively movable supplementary fork, springs within said tubular members at the upper ends thereof, said members being provided with slots adjacent to said springs, and extensions from the supplementary fork adapted to enter said slots and engage said springs.

2. In a motorcycle, a front wheel fork comprising tubular members, a handle bar attached directly to said tubular members a relatively movable supplementary fork, coil springs in said tubular members, said tubular members being provided with slots adjacent said springs, extensions from the supplementary fork projecting through said slot and abutting the springs at one end, and adjustable nuts having screw threaded engagement with the tubular members abutting the springs at the other end.

3. In a motorcycle, a handle-bar, three tubular members attached thereto at their upper ends, the middle member being rotatively engaged by the motorcycle frame, and the outer members being extended on either side to form the front wheel fork, and a cross member uniting the three tubular members at the lower end of the middle one thereof.

4. In a motor cycle, a front wheel fork having tubular members with slots in the sides thereof, a supplementary fork, projections from said supplementary fork through said slots, springs within the members of the main fork engaging said projections, and sliding sleeves around said members of the main fork with holes therethrough to accommodate the said projections.

5. In a motor cycle, a handle bar, parallel tubular members attached thereto constituting a front fork, each said member being slotted from its upper end downwardly for a certain distance, a supplementary fork with projections therefrom through said slots, springs within the members of the front fork to engage said projections, and removable means inserted in the upper ends of said slots to close the same.

6. In a motor-cycle, a front wheel fork comprising two tubular members, a handle bar connected directly to both said members, coil springs within said tubular members, a relatively movable supplementary fork, a front wheel axle, levers pivotally connected between the lower ends of said forks and the said axle, and extension members from the supplementary fork engaging the said springs.

7. In a motor-cycle, a front wheel fork consisting of two tubular members, a handle bar directly connected to both said members, a relatively movable supplementary fork, a U-shaped spring supported at its middle point on said main fork, brake pads on the ends of said spring engaging the members of the supplementary fork, coil springs within the tubular members of the main fork, extensions from the supplementary fork engaging said springs, a front wheel axle, and pivotal connections between the same and the lower ends of the forks.

8. In a motor-cycle, a handle bar, parallel tubular members attached thereto, each said member being slotted longitudinally on its inner side, springs within said tubular members, a front wheel axle, and connections therefrom to engage said springs.

9. In a motor-cycle, a handle bar, parallel tubular members attached thereto, coil springs within said tubular members, a front wheel axle, and a fork extending upwardly from said front wheel axle and engaging said coil springs.

In testimony whereof, I have subscribed my name.

GEORGE H. MEISER.

Witnesses:
LILLIAN A. KIBBY,
EDYTHE M. ANDERSON.